(12) United States Patent
Lehuede

(10) Patent No.: US 6,466,467 B2
(45) Date of Patent: Oct. 15, 2002

(54) INVERTER OR CONVERTER BY CURRENT INJECTION, PROVIDED WITH A CIRCUIT WHOSE GENERATING FREQUENCY FOR THE ALTERNATING VOLTAGE IS ADJUSTED BY THE LOAD'S RESONANT FREQUENCY, CYCLE TO CYCLE, WITHOUT LAGS

(76) Inventor: Patricio Lagos Lehuede, Simón Bolivar 8359, Casa C, La Reima, Santiago (CL)

( * ) Notice: Subject to any disclaimer, the term of this patent is extended or adjusted under 35 U.S.C. 154(b) by 0 days.

(21) Appl. No.: 09/984,417

(22) Filed: Oct. 30, 2001

(65) Prior Publication Data

US 2002/0118555 A1 Aug. 29, 2002

(30) Foreign Application Priority Data

Dec. 22, 2000 (CL) .......................................... 3586-2000

(51) Int. Cl.[7] ...................... H02M 3/06; H02M 7/5387
(52) U.S. Cl. ......................................... 363/62; 363/132
(58) Field of Search .............................. 363/62, 65, 71, 363/72, 95, 97, 131, 17, 132, 56; 323/284, 285; 327/172, 173, 174, 176

(56) References Cited

U.S. PATENT DOCUMENTS

| | | | | | |
|---|---|---|---|---|---|
| 4,616,300 | A | * | 10/1986 | Santelmann, Jr. | 363/61 |
| 5,430,632 | A | * | 7/1995 | Meszlenyi | 363/17 |
| 5,617,306 | A | * | 4/1997 | Lai et al. | 363/17 |
| 5,841,646 | A | * | 11/1998 | Cornec | 363/56 |
| 6,084,450 | A | * | 7/2000 | Smith et al. | 327/172 |
| 6,108,215 | A | * | 8/2000 | Kates et al. | 363/17 |

* cited by examiner

Primary Examiner—Rajnikant B. Patel
(74) Attorney, Agent, or Firm—Sughrue Mion, PLLC

(57) ABSTRACT

An inverter or converter by current injection, provided with a circuit whose generating frequency for the alternating voltage is adjusted by the load's resonant frequency, cycle to cycle, without lags. The inverter or converter permits avoiding power losses when transferring energy as a result of the variation in the load's resonant frequency that necessarily occurs in all fixed frequency inverters. The inverter or converter may be characterized as a frequency interlocking circuit, provided with at least one voltage scanner in the load, adapter and galvanic insulation, one lead circuit, one clipping circuit, one comparator circuit and one oscillator and coupling circuit.

9 Claims, 4 Drawing Sheets

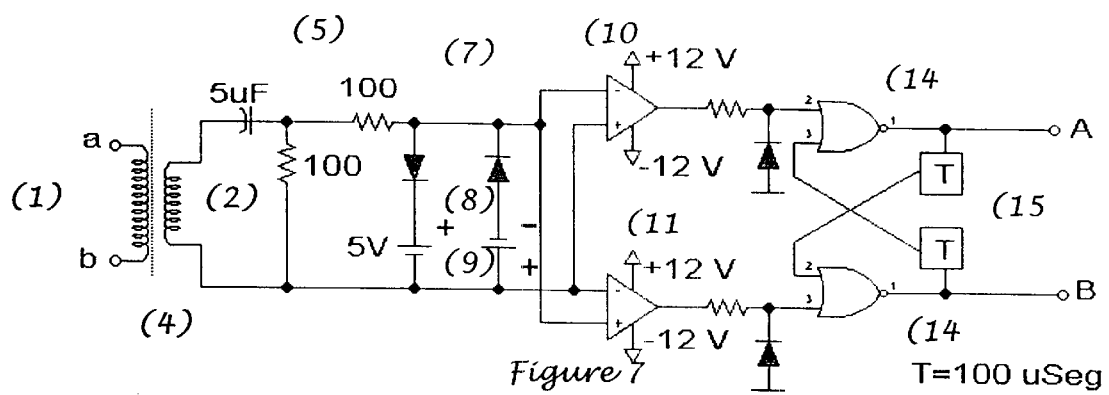
Figure 7 T=100 uSeg

US 6,466,467 B2

INVERTER OR CONVERTER BY CURRENT INJECTION, PROVIDED WITH A CIRCUIT WHOSE GENERATING FREQUENCY FOR THE ALTERNATING VOLTAGE IS ADJUSTED BY THE LOAD'S RESONANT FREQUENCY, CYCLE TO CYCLE, WITHOUT LAGS

SUMMARY

This invention refers to an inverter or converter by current injection, provided with a circuit whose generating frequency for the alternating voltage is adjusted by the load's resonant frequency, cycle to cycle, without lags, which permits avoiding power losses when transferring energy as a result of the variation in the load's resonant frequency that necessarily occurs in all fixed frequency inverters, characterized as a frequency interlocking circuit, provided with at least one voltage scanner in the load, adapter and galvanic insulation, one lead circuit, one clipping circuit, one comparator circuit and one oscillator and coupling circuit.

SPECIFICATION

This invention refers to an inverter or converter by current injection, provided with a circuit whose generating frequency for the alternating voltage is adjusted by the load's resonant frequency, cycle to cycle, without lags, which permits avoiding power losses when transferring energy as a result of the variation in the load's resonant frequency that necessarily occurs in all fixed frequency inverters.

In general, in the field of electrical engineering, the inverter or converter is the device, equipment or electric system that is able to convert continuous power (kW) into alternate power (kva).

There are different types of converters. Depending on the type of electric power that they supply, these are classified in four categories, according to the process they carry out:

a) AC/DC rectification, a process that converts alternate current into continuous current;

b) CC/CC conversion, that converts a continuous current into another that is also continuous but has different voltage characteristics or levels;

c) DC/AC inverter, conversion of continuous current into alternate, and d) AC/AC conversion, a process that converts one alternate current into another that is also alternate but has different voltage and/or frequency characteristics.

The transformation from continuous voltage to alternate voltage is achieved by inverting the polarity of the source on the load by using interruption and connection devices.

A source of continuous voltage, see FIG. 1, in this case a battery is connected to a load using a set of four switches that act in pairs, connecting alternate polar voltage periodically. The load "perceives" a voltage source in the shape of a square wave that alternates the value +Vcc and −Vcc. This is the principle of any inverter, a source of continuous power controlled by a group of switches that alternate the polarity in the load producing an alternated signal.

This is the operating principle of any inverter, a source of continuous power controlled by a set of switches that alternate the polarity in the load producing tension and alternated current in the load.

Present-day inverters or converters employ solid state elements, capable of controlling high powers that act as controlled electronic switches that periodically exchange the polarity of the continuous source on the load to a pre-assigned frequency, by means of electronic oscillatory circuits (interval timers).

The name resonant tank is given to a circuit (group of passive electric elements), formed by resistors, capacitances and inductances (RLC circuit) placed in a such a way that in order to inject current (parallel resonant) or applied voltage (series resonant) with a frequency known as resonant frequency, the impedance of the capacitance and inductance annul each other and remain limited only by the resistance of the circuit.

The circuit of the inverter that we wish to patent, refers exclusively to the case of parallel resonant tanks that are characterized because the capacitance is in parallel with the inductance and resistance as shown in FIG. 2.

Consequently, the parallel resonant circuits produce a great alternate current circulating between the coil and the condenser when they are in resonance, limited only by the series resistance, with a small real excitation current entering the tank.

This result is very often used to produce heating by magnetic induction, because according to the Ampere Circuital Law all intensity of alternate current produces a magnetic field around it that, in turn, induces voltages in any conductor that is near it. This is the principle whereby inductive heating is produced; internal voltages are induced in a metal conductor, in the presence of an alternate magnetic field, which cause currents to circulate that produce the heating due to the Joule effect.

All the present-day inversion systems for these applications of inductive heating work at a fixed frequency, normally within the range of 200 Hz to 10 kHz, designed to generate, by the injection of a continuous current, an alternating voltage of fixed frequency to the resonance of the tank assuming an invariability in time of the tank's resonant frequency.

The specific construction of the single-phase inverters by current injection that exist in the market are manufactured using rapid power thyristors or more recently by GTO (gate turn-off). Both are solid-state devices able to rectify alternate current that conduct current in a single direction and whose conduction mode is to have a positive anode-cathode polarity and an electronic switch signal in their tripping gate.

To cut the conduction, the current must necessarily be zero, therefore a current must be injected that has the same magnitude but in the cathode-anode direction, by the voltage of the load of the tank itself (load switching) tripping the other pair of lead semiconductors with regard to the passing through zero of the voltage. Consequently, the lead time in the tripping depends on the frequency and is a very delicate value because faced with a variation in frequency the SCR (Silicon Controlled Rectifier) might not be turned of or it may be subjected to excessive voltage. All the above necessarily forces the circuits to be of a fixed frequency and higher than the resonant frequency.

The resonant inverters have a broad field of application in industry in general. They are used where a clean, rapid and efficient transfer of heat is required such as thermal treatments and fusion of metals.

The principle of energy transference is through the generation of an intense magnetic field produced by a high resonance current that circulates in the RLC tank.

The problem solved by this invention is to avoid power losses in the transfer of energy resulting from the variation of the load's resonant frequency that is produced necessarily in all fixed frequency inverters and it also allows the inverter to work in resonant frequency with any load without needing special adjustments, within the range for which it was designed.

In effect, the tank's resonant frequency (RLC circuit) depends only on the physical characteristics of its components, that is, resistance, inductance and capacitance. In the particular case of an oven, the resistance depends specially on its volume, the type of metal and its magnetic properties. The inductance will depend principally on its physical dimensions, number of windings, material to be heated or melted and temperature. On the other hand, normally, the capacitance is fixed with values that may be adjusted discretely (taps).

In particular, the temperature has an important effect on the coil's resistance and reluctance. This is specially highlighted in the case of magnetic materials that, below the Curie temperature (760° C.), have a magnetic permeability approximately 50 times greater than when they are above this temperature (magnetic permeability of the vacuum).

All the nonmagnetic metals such as copper, aluminum, certain steels, etc. present a permeability of dose to 1 or equal to 1 (permeability of the vacuum) and in these cases the reluctance varies little but the resistance, that increases as the temperature rises, does.

The coil's inductance varies with the number of turns and the diameter. Consequently, when the inverter has a fixed frequency there is one and only one coil-condenser pair that will adjust to the frequency of the source. If the coil is changed then it becomes necessary to change the capacity in the condensers.

To summarize, fixed frequency inverters have the following limitations:

Variations of the inductance require the modification of the capacitance and vice versa.

The load does not always operate at resonant frequency.

The energy transfer power is not constant throughout the temperature.

A source cannot feed the different tanks without modifying its characteristics to adapt it to the frequency of the inverter.

The filling volume affects the resistance and thus the tank's resonant frequency; therefore operating at half volume or partial load is inefficient.

The manner in which the load is filled influences the value of the inductance and therefore the resonant frequency.

The problem in the present-day technique that this invention solves is that, because of their present characteristics, existing inverters cannot be designed to operate at a variable "cycle to cycle" frequency as a result of the intrinsic characteristics of these power circuits that normally employ semiconductors of the thyristor or GTO (Gate Turn Off) type.

In effect, turning off the semiconductors requires an important current in the inverse direction, for which the same tension of the resonant tank is used, applied in the reverse manner by tripping the opposite branch of the inverter. This signal of conduction to the opposite branch must be advanced at the moment in which the tension is annulled to have an inverse tension that is sufficient to force the turning off of the thyristor. Otherwise, the SCR may continue conducting and short-circuit the tank If, because of a variation in the load, the frequency has to be lowered, it is very probable that the delay in the tripping of the opposite branch will mean that there will not be sufficient energy in the tank to turn it off. On the other hand, if the frequency increases, the conduction of the SCR will be very small and will produce strong oscillations in the inverter bridge.

Another important problem in the current technique solved by the invention is that the resonant inverters switched by the load require a STARTING POWER CIRCUIT that sends a pulse of energy to the resonant tank to start the oscillation and is not used after that. The scheme developed by the inverter of this invention does not require this auxiliary power circuit because it starts with the load directly.

To summarize, the present solutions for the resonant inverters switched by the load have two inconveniences for which the technique has not found a commercial solution:

They cannot work at variable frequencies cycle to cycle.

They require a start-up power circuit.

DISADVANTAGES OF PRESENT INVERTERS

The principal disadvantages or problems of the present resonant inverters switched by the load are:

Load factor low when not transferring the power in condition of 100% of resonance for all points of operation.

The tank's load must be constant.

Cannot work with different tanks without modifying its RCL parameters externally to adjust to the frequency of the source.

The cutting of the conduction of the semiconductors does not take place at the minimum tension point in the condensers.

They require more electronics and power components for the ignition circuit.

DESCRIPTION OF THE DRAWINGS

For a better understanding of the new inverter, both in the novel design and in the construction by current injection, whose frequency of generation of the alternate tension is adjusted by the resonant frequency of the load, cycle to cycle, without lags (exact sine wave), we shall do it according to the drawing detailed below, without limiting the scope in the application and function that may be used for the different fields of technology.

FIG. 7 shows the acquisition circuit and pulse generator of the inverter of this invention.

The invention rests on the following relevant theoretical and technological aspects and innovating control circuits:

The transient response from the resonant load to the step sinusoidal current forcing is a decreasing exponential current modulated by the tank's resonant frequency.

The recent existence in the market of the power transistors (IGBT) able to switch on and off high power with electronic signals, permitting the switching of the inverter with tension zero in the tank and maximum current in the coil.

An electronic circuit for signal acquisition connected directly to the tank, capable of coupling the resonant frequency in a half of a cycle.

Transient response of a resonant tank load forced by step sinusoidal current.

Figure 1:
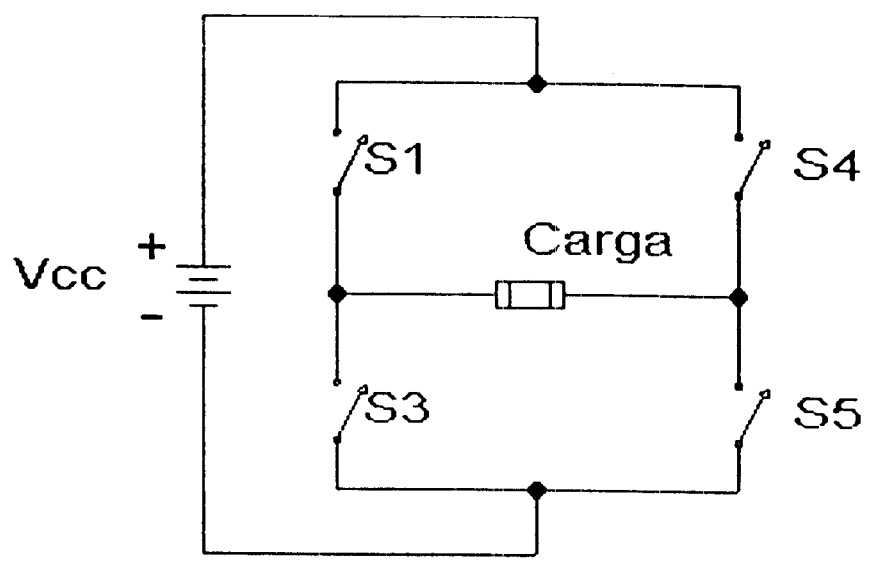
FIG. 1 shows a circuit of the principle of the inverter.
Figure 2:
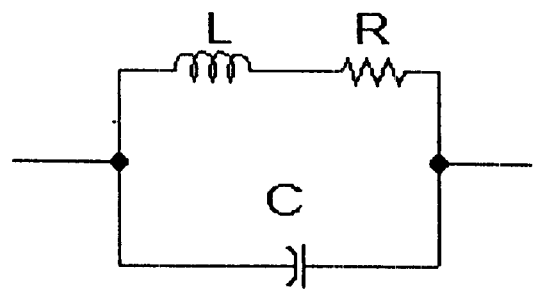
FIG. 2 shows a resonant tank in parallel.
Figure 3:
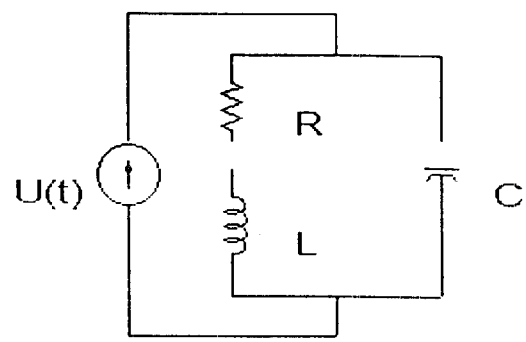
FIG. 3 shows a resonant parallel RLC Tank fed by a step current.

According to FIG. 3, the resonant parallel RLC circuit fed by a step sinusoidal current.

Where the impelling function is given by the equation, $$I_F(t) = k\cos(w_F t + \varphi) \times U(t)$$

Applying the laws of Kirchoff to the upper node and the principal loop, the following terms are established:

$$E_c(t) = R \times I_l + L\frac{dI_l(t)}{dt}$$

$$I_c(t) = C\frac{dE_c(t)}{d(t)} = I_F(t) - I_l(t)$$

$$\Rightarrow I_l(t) = I_f(t) - C\frac{dE_c(t)}{dt}$$

Clearing the above equations and rearranging, we find the following expression for the voltage in the condenser in terms of the forcing function:

$$\frac{d^2 E_c}{dt^2} + \frac{R}{L}\frac{dE_c}{dt} + \frac{1}{LC}E_c = \frac{1}{C}\frac{dI_F(t)}{dt} + \frac{R}{LC}I_F(t)$$

A second degree linear equation that has a solution of the transitory type and another permanent one, whose general expression is $$e(t) = e^{\frac{R}{2L}t}[A\cos(w_0 t) + jB\sin(w_0 t)] + \sin(w_F t + \varphi)$$

Where $w_o$ is the resonant frequency belonging to the RLC tank expressed by the ratio $$w_0 = \sqrt{\left(\frac{1}{LC} - \frac{R}{2L}\right)}$$

The expression of the voltage can also be expressed as:

$$e(t) = A \times e^{\frac{R}{2L}t}\sin(w_0 t + \varphi_0) + B\sin(w_F t + \varphi_F)$$

By continuity of the function Ec in the environment to t=0− and t=0+ you can find the constants of the general answer;

$$Ec(0^-) = 0 = A\sin\varphi_0 + B\sin\varphi_F$$

$$Ec(0^-) = 0 = A\sin\varphi_0 + B\sin\varphi_F$$

Nevertheless, both expressions in sine are linearly independent, consequently the above can only occur if the two angles are null, therefore the expression is reduced to:

$$e(t) = A \times e^{-\frac{R}{2L}t}\sin(w_0 t + \varphi_0) + B\sin(w_F t + \varphi_F)$$

Applying the continuity of the expression of the current, we conclude that, $$\frac{dE_c(0^-)}{dt} = \frac{1}{C}I_F(0^-) = 0$$

Deriving the expression for Ec with regard to t, $$\frac{dE_c(t)}{dt} = A \times e^{\frac{R}{2L}t}\left\{\left(\frac{R}{2L}\sin w_0 t + w_0\cos w_0 t\right)\right\} + B \times w_F\cos w_F t = 0$$

we can clear the constants A and B $$= Aw_0 + Bw_F = 0$$

$$A = -\frac{w_F}{w_o}B$$

Therefore,
The final expression of the answer remains as follows:

$$E_c(t) = K\left[\left(\frac{w_F}{w_0}\right)e^{\frac{R}{2L}t}\sin w_0 t + \sin w_F t\right]$$

Figure 5:
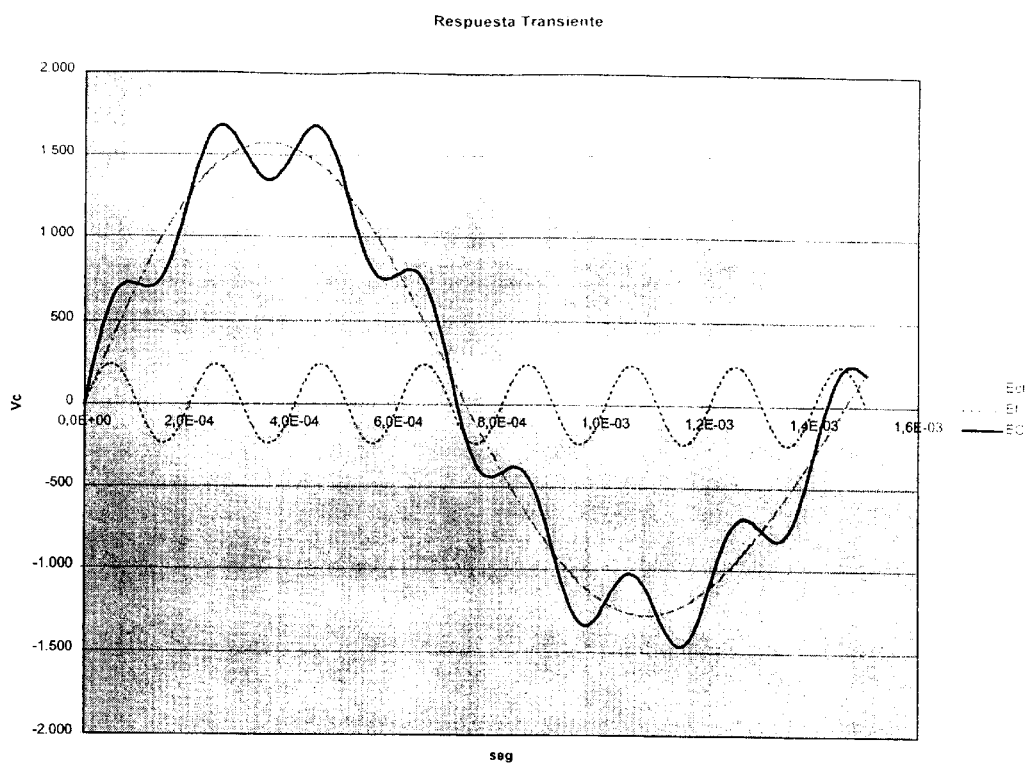
FIG. 5 shows a graph with the resonant tanks' transitory answer to a forced current source.
Figure 6:
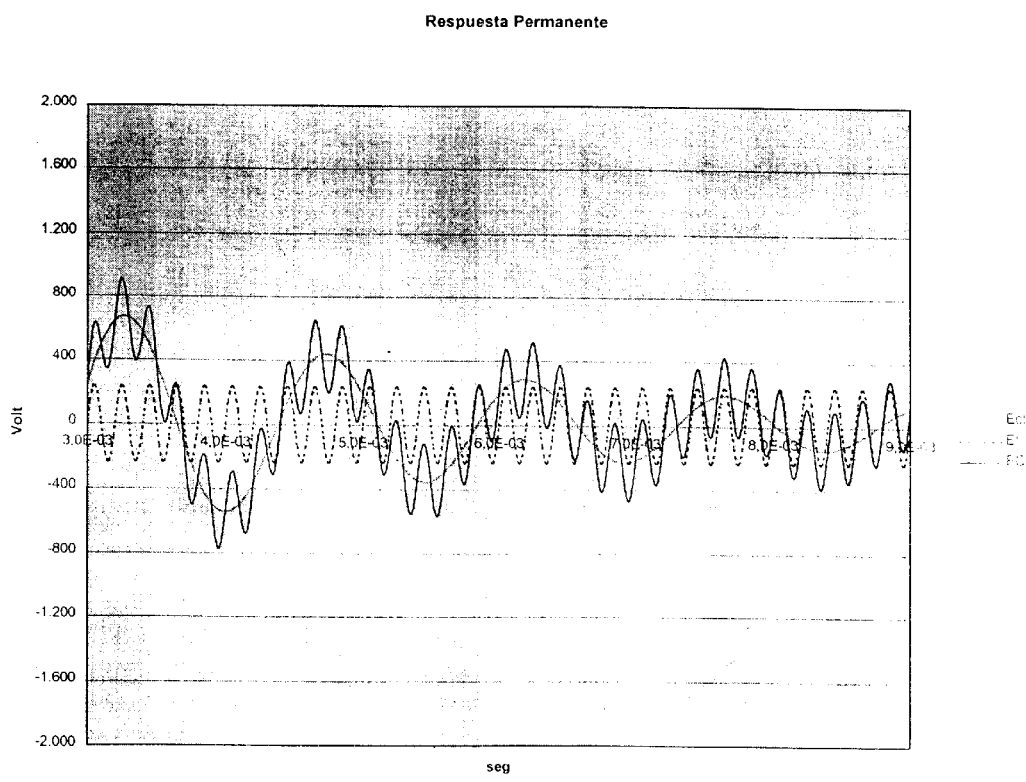
FIG. 6 shows a graph with the resonant tank's permanent answer to a forced current source.

The wave shape of the answer is sinusoidal with a resonant frequency modulated by the sampling frequency and dampened exponentially plus a frequency sine wave of the forcing signal (5000 Hz). FIGS. 5 and 6 show a graph with this expression, for the transient zone (6 microseconds) and the permanent zone (100 microseconds).

The Power Transistors

Another fundamental aspect in the development of this novel inverter rests on the recent development of the high power transistors, or IGBT (Insulated Bipolar Transistors), with a nominal current of 800 A and a voltage of 1200 Vac.

The IGBT have the combined advantages of the MOSFET (MOS Field-Effect Transistor), BJT and GTO (Gate Turn Off Switch) simultaneously. As is the case with the MOSFET, the IGBT have a high gate impedance, which means a small amount of energy to trigger them. Like the BJT, they present a minimum direct conduction voltage even with high inverse voltages (ie., 2–3 Volt with 1200 Volt blocking). And like the GTO, they can block negative voltages behaving as an ideal switch that conducts and turns off with an electronic signal.

Figure 4:
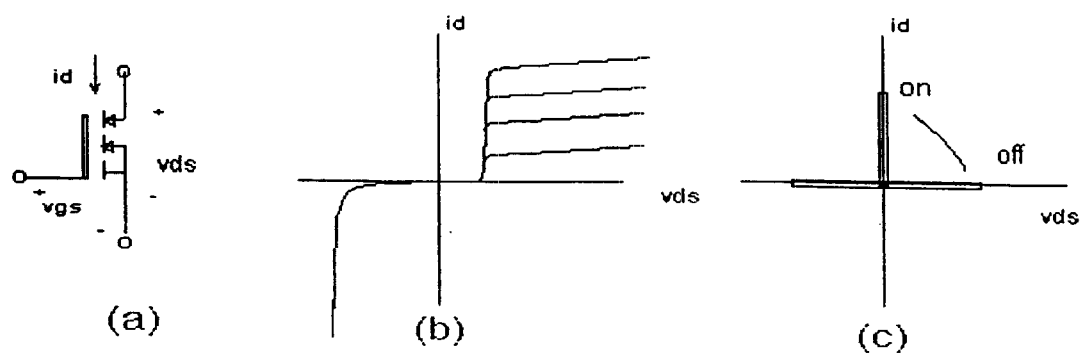
FIG. 4 shows (a) symbol of IGBT, (b) i-v characteristics and (c) idealized characteristics.

FIG. 4 shows the IGBT symbol, its typical operation curves and its idealized diagram For example, following are the more relevant characteristics of an IGBT of 800 A and 1200 V:

| Charactistic | Symbol | Unit | Value |
|---|---|---|---|
| Voltage Collector Emitter | Vces | Volt | 1200 |
| Collector Current | Ic | Amp | 800 |
| Peak current collector | Icp | Amp | 2400 |
| Dissipation collector | Pc | Watt | 2318 |
| Opening time inductive load | ton | Usec | 1.4 |
| Closing time inductive load | toff | Usec | 3.0 |
| Maximum cutoff frequency | fpwm | KHz | 20 |

The fundamental characteristic that permitted the development of the inverter refers to the fact that it can cut the conduction of the nominal current in less than 3 microseconds. A time equivalent to one third of the time of the maximum resonant cycle of the equipment defined as 10 kHz. This is equivalent to saying that the current is cut instantaneously in the ranges of the operating frequency (less than 10 KHz).

Nevertheless, the power circuits will have to be designed carefully because the energy accumulated in the tank, particularly the high current in the coil when the transistor is cut with the voltage at zero, produces an excess voltage that can damage the semiconductors.

To summarize, the only characteristic of the power transistors that permits cutting the load current instantaneously with a simple electronic signal provides the basic tool to build the inverter that can generate an alternate source that is regulated in each hemicycle according to the resonant frequency that is acquired from the transitory answer to the step, seen in the previous point.

Electronic Acquisition

The final complementary development was the building of an electronic device, capable of sampling the voltage in the load instantaneously and interlocking with the frequency of the transitory answer to a step current, that corresponds to the load's resonant frequency.

FIG. 7 shows the circuit designed that has this characteristic and that is the innovative part, which is what makes the resonant inverter with frequency adjusted by the load an invention.

The system consists of a circuit with the following stages:

Voltage scanner in the load, adapter and galvanic insulation.

Lead circuit

Voltage clipping circuit

Comparator circuit

Oscillator circuit and coupling circuit

Each one of the stages fulfills a particular purpose that is explained below (see FIG. 7).

Voltage Sampler (1): This part of the circuit consists basically of a single-phase or twice-wound transformer (2) with adequate insulation against the overvoltage present in the bank of load condensers (3) see FIG. 3, which measures the instantaneous voltage present in the load and transforms it into a lower voltage. The primary winding of the transformer (2) is at load potential and floating with regard to the earth of the secondary. There is also an electrostatic shield (4) or a potential and/or conventional optocoupled circuit (LED diodes) or other equivalent one that avoids the appearance of spikes that might contaminate the signal.

Lead Circuit (5): Basically, the lead circuit is a RC mesh (6) that permits the signal read in the load to be advanced in a few microseconds. This is done to compensate the lags characteristic of the control and triggering electronics of the power transistors.

Voltage trimmer Circuit (7): This circuit was designed to "square" the tank's sinusoidal signal and reduce the voltage, adapting it to the electronic circuit. This circuit (7) is formed by an antiparallel of diodes (8) and sources of fixed voltage in series (9), optionally replaced by other equivalent active or passive electronic devices that permit the clipping of the alternate signal coming from the entry, Zener diodes, condensers, transistors or the like.

Comparator Circuit (10): These are two amplifiers (11) operating connected to the outlet of the trimmer circuit or galvanic isolation circuit (1) that can be replaced by other electronic circuits that permit signal comparison. These amplifiers (11) produce an alternate pulse according to the polarity of the signal samplerwith regard to the contact to earth of the secondary of the sampler.

Oscillator circuit and coupling circuit (13): This is made up of electronic logic gates (14) and interval timers (15) operating at a high base frequency. This part of the circuit produces an alternate signal having a minimum frequency adjusted by the interval timers, in our example at 5000 Hz, and when a rising or falling edge is detected in the sampler circuit, it engage with this signal thereby producing an output who match exactly the resonance frequency of the tank. One key and fundamental aspect is that the circuit's own oscillation rate must be greater than the maximum resonant frequency expected in the load, otherwise there will be no link and it will continue oscillating at its own frequency. The circuit output control the firing of the opposed IGBT, producing the oscillation at the resonant frequency of the load, each half cycle to each half cycle.

What is claimed is:

1. An inverter or converter by current injection, provided with an electronic circuit whose alternate voltage generating frequency is adjusted by the load's resonant frequency, CHARACTERIZED as a frequency interlocking circuit, provided with at least one load voltage sampler, adapter and galvanic insulation, one lead circuit, one trimming circuit, one comparator circuit and one oscillator circuit and coupling circuit.

2. An inverter or converter by current injection, provided with an electronic circuit, according to claim 1, CHARACTERIZED because said voltage sampler consists of a transformer insulation present in the bank of capacitors; also presents an electrostatic shield or potential and/or conventional optocoupled circuit shield (LED—light emitting diodes) or another equivalent shield that will permit effective galvanic oscillation.

3. An inverter or converter by current injection, provided with an electronic circuit, according to claim 1, CHARACTERIZED because the transformer with the capacitors, permits the measurement and transformation into a lower voltage of the instantaneous voltage present in the load.

4. An inverter or converter by current injection, provided with an electronic circuit, according to claim 2, CHARACTERIZED because the electrostatic shield avoids the electromagnetic noise that might contaminate the signal.

5. An inverter or converter by current injection, provided with an electronic circuit, according to claim 1, CHARACTERIZED because the lead circuit is made up at least by a RC mesh, while another equivalent passive or active, adjustable or fixed electronic circuit may be used.

6. An inverter or converter by current injection, provided with an electronic circuit, according to claim 1, CHARACTERIZED because the trimming circuit is made up of an antiparallel of diodes and fixed tension couplings in series, optionally replaced by other equivalent active or passive electronic devices that permit the trimming of the alternate signal coming from the gate, Zener diodes, condensers, transistors or the like.

7. An inverter or converter by current injection, provided with an electronic circuit, according to claim 1, CHARACTERIZED because the trimming circuit can be aligned prior to the galvanic insulation, especially if it is squashed.

8. An inverter or converter by current injection, provided with an electronic circuit, according to claim 1, CHARACTERIZED because the comparator circuit forms it, operational amplifiers connected to the outlet of the trimmer circuit or galvanic insulation circuit (optocoupled), it being possible to replace them by other electronic circuits that permit comparing the signals.

9. An inverter or converter by current injection, provided with an electronic circuit, according to claim 2, CHARACTERIZED because the transformer with the capacitors, permits the measurement and transformation into a lower voltage of the instantaneous voltage present in the load.

* * * * *